US007017728B2

(12) United States Patent
Nyquist

(10) Patent No.: US 7,017,728 B2
(45) Date of Patent: Mar. 28, 2006

(54) PNEUMATICALLY ACTUATED CHUTE DOOR AND SYSTEM EMPLOYING THE SAME

(75) Inventor: Lawrence M. Nyquist, Joliet, IL (US)

(73) Assignee: Nycor Products and Services, Inc., Joliet, IL (US)

( * ) Notice: Subject to any disclaimer, the term of this patent is extended or adjusted under 35 U.S.C. 154(b) by 0 days.

(21) Appl. No.: 10/918,726

(22) Filed: Aug. 13, 2004

(65) Prior Publication Data

US 2005/0155837 A1 Jul. 21, 2005

Related U.S. Application Data

(60) Provisional application No. 60/536,798, filed on Jan. 15, 2004.

(51) Int. Cl.
*B65G 11/16* (2006.01)

(52) U.S. Cl. ........................................ 193/33; 193/34

(58) Field of Classification Search ................ 193/2 R, 193/15, 20, 28, 31 A, 33, 34
See application file for complete search history.

(56) References Cited

U.S. PATENT DOCUMENTS

| | | | | |
|---|---|---|---|---|
| 636,825 | A | | 11/1899 | Maurer |
| 762,692 | A | | 6/1904 | Davis et al. |
| 1,716,707 | A | | 6/1929 | Schoelkopf |
| 2,081,554 | A | | 5/1937 | Nicol |
| 2,438,972 | A | | 4/1948 | Hoffman |
| 3,183,873 | A | | 5/1965 | Hamilton |
| 3,977,495 | A | * | 8/1976 | Zephinie ...................... 193/34 |
| 3,980,166 | A | * | 9/1976 | de Feudis .................... 193/34 |
| 4,002,229 | A | | 1/1977 | Washington |
| 4,071,977 | A | | 2/1978 | Price |
| 4,076,321 | A | | 2/1978 | Haight et al. |
| 4,339,998 | A | * | 7/1982 | Finch ......................... 110/186 |
| 5,588,258 | A | | 12/1996 | Wright et al. |
| 6,062,368 | A | | 5/2000 | Kamm |
| 6,092,336 | A | | 7/2000 | Wright et al. |
| 6,186,306 | B1 | | 2/2001 | Kamm |
| 6,269,928 | B1 | | 8/2001 | Kamm |
| 2004/0084276 | A1 | * | 5/2004 | Repic et al. .................. 193/34 |

OTHER PUBLICATIONS

Wilkinson-Hi-Rise, LLC, "Trash Chute / With ADA Compliant Intake Doors", Jun. 2002, 5 pages.

* cited by examiner

*Primary Examiner*—James R. Bidwell
(74) *Attorney, Agent, or Firm*—Brinks Hofer Gilson & Lione

(57) ABSTRACT

A chute system having a pneumatically actuated access door where the door is journally mounted to an access port in the wall and communicates with the chute to direct objects inserted into the access port to the chute. When an operator actuates a switch, the door may be opened by a pneumatic forcer connected between the access port frame and the door so as to form a lever arm about the door journal. The pneumatic forcer is mounted to the door with a slidable journal such that the door may be opened manually. The duration of the open state of the door is determined by a timing mechanism which removes the pneumatic pressure after a time has elapsed, enabling a spring to urge the door into the closed position.

39 Claims, 5 Drawing Sheets

PNEUMATICALLY ACTUATED CHUTE DOOR AND SYSTEM EMPLOYING THE SAME

This application claims the benefit of U.S. provisional application No.:60/536,798, filed on Jan. 15, 2004, which is incorporated herein by reference.

BACKGROUND OF THE INVENTION

This invention relates to the art of chute systems, and more particularly to chutes for the collection and disposal of refuse of various kinds, as well as the collection and distribution of materials. Further, this invention relates to a mechanism for opening a chute door.

Chute systems are found in numerous applications, such as for the collection of trash in high rise buildings, the collection of laundry in hotels and hospitals and for the collection of medical or other waste. They may also be found in materials handling applications in industrial facilities. For safety or sanitary reasons, chute systems may be fitted with a door closing the opening into the chute during times that material is not being introduced into the chute. This prevents the discharge of particulate matter, odors or other contaminants into the surrounding environment. Also, in the case of a fire or explosion in the chute system, the door provides a barrier which mitigates the effect of the event.

Existing door systems are normally manually operated where the operator opens the door, inserts the material for which the chute is designed, and closes the door. Doors may be fitted with an opening handle and a latch mechanism, such as may be found on a conventional room door, to ensure that the door remains closed when not in use, and may also be fitted with a closing mechanism to urge the door closed. The closing mechanism may be in the form of a spring, with coil spring, leaf spring air spring and pneumatic spring mechanisms being known in the art.

Manually operated doors normally require that the operator use one hand to open the door, and to hold the door open during the period where the material is being introduced into the chute system through the door. If the load is heavy or the operator is handicapped, this may be both awkward and dangerous. In addition, a manually operated door may be opened even if dangerous conditions exist in the chute system, such as a fire, smoke or noxious fumes.

Electrically operated chute doors are known, and they mitigate some of the problems mentioned above, but themselves have disadvantages. Complex mechanical linkage mechanisms are required to effect the door opening and closing, and the electric motor is susceptible to overheating and burn out in the event the door becomes jammed in any position, open, partially open or closed. One means of preventing the continued operation of the motor is to place the motor on a timer, but the motor will operate against the resistance of the jammed door for the entire period that the timer permits. Other means of preventing the continuing operation of the motor include microswitches to sense the open and closed position of the door. It is well known that microswitches present a maintenance and adjustment problem. Another problem associated known electrically actuated doors is that the mechanical linkage mechanism may not permit the door to be opened manually. Attempting to open the door manually may place undesirable stresses on the mechanical linkages and result in a requirement for frequent maintenance.

BRIEF SUMMARY OF THE INVENTION

Features of the present invention may mitigate the difficulties previously described, as well as improve the operation and safety of chute systems. These objectives are achieved while minimizing the complexity of the mechanical components needed to effect the automatic opening and closing of the chute door.

In accordance with the present invention, a chute system, which is a generally vertically oriented enclosed space, having a vertical extent generally at least equal to the highest story of a building or facility to be serviced, is fitted with a door assembly at each story to be serviced by the system. The chute itself is normally enclosed in a fireproof material for safety reasons. The door assemblies are constructed of material ordinarily intended to retard fire or explosion in accordance with local or industry building codes, or to meet the requirements of the designer. The opening of the door is initiated by an operator actuating a switch located in proximity to the door, or by a sensor that determines the presence of an operator. The door may be disposed such that it is journalled to a frame which is mounted so as to fill an opening in the wall of the chute system, the door closing an opening in the frame when the door is in a closed position. In one aspect, the door may be mounted such that, when it opens, an end of the door distal to a journalled base end rotates outwardly (that is, towards the operator) with respect to the chute such that the door makes an angle of approximately 45 degrees with respect to the horizontal when fully opened, although other orientations and opening limits may be employed. The extent and direction of the door opening and depends on the specific design requirements. Preferably the angle is less than 90 degrees with respect to the horizontal, so as to provide an inclined surface to direct the material into the chute.

A pneumatic supply, which may be installed in a common area, provides pressurized air to one or to a plurality of door opening mechanisms. When the opening of a door is initiated as described above, pressurized air is introduced into a main pneumatic cylinder or pneumatic forcer disposed between the door and the door frame of the door assembly. The main pneumatic cylinder rod actuates in response to the air pressure and urges the door open. The door is rotatably moved from a closed position to the fully opened position. A spring is also connected between the frame and the door, and it is actuated by the opening and rotation of the door, resulting in the development of a restoring force about the journal, said force initially being less than the opening force exerted by the main pneumatic cylinder. The door continues to rotate until a mechanical limit is reached, or the rotational forces about the journal exerted by the main pneumatic cylinder and the spring balance each other.

The door is held in its open position as long as the pneumatic pressure is applied to the main pneumatic cylinder. The time duration of this pressure is controlled by a pneumatic timer valve. The duration may be fixed or adjustable in accordance with the details of the design. At the end of the opening time period, the pneumatic pressure is relieved in the main pneumatic cylinder and the pneumatic spring urges the door closed. Mechanical or pneumatic springs may be used.

In accordance with another aspect of the present invention, the door is also capable of being opened manually. The main pneumatic cylinder is attached to the door and to the frame such that a force applied to the outside of the door by an operator grasping a provided handle is operable to rotate the door as if it had been urged by the main pneumatic cylinder. The door may be opened to any rotational extent between the closed position and the fully open position. A restoring force is provided by the spring so that the door will close when the operator releases the handle. In this manner, the door may be opened manually if the operator desires, and the door may be opened even in case of a fault in the pneumatic system.

In accordance with still another aspect of the present invention, the door may have a latch mechanism to secure the door in a closed position. This may be similar to a conventional door latch where a bolt in the door is urged by a spring so as to engage an opposing hole in the frame, or some similar arrangement. In order for the pneumatic opening mechanism to operate to open the door, this bolt must be released at the beginning of the opening operation. An actuator may be arranged in the hole in the frame engaged by the bolt so as to urge the bolt towards the door such that it no longer engages the hole in frame. The actuator may operate by electrical or pneumatic means, and may have a spring return such that it retracts when the activating means is discontinued, permitting the latch to re-engage the hole in the frame as the door reaches a closed position. Alternatively, the actuator may be urged into a retracted position by the spring force applied to the latch bolt when it is positioned opposing the hole in the door frame.

In any aspect of this invention, the pneumatic operation of the door may be prevented if there is an unsafe condition in the chute as determined by one or more temperature sensors or one or more smoke or contaminant sensors. In particular, a sensor may be installed in a collection area at the base of the chute to determine if a sensing threshold has been exceeded and to actuate a shut off valve to interrupt the pneumatic supply to the door actuation mechanism. Preferably, the pneumatic pressure being supplied to the door assemblies may also vented to the ambient environment when the solenoid is actuated so that a door cannot be pneumatically opened with any residual air pressure in the system. This feature prevents the door from opening or remaining open for a preset time due to residual pressure in the pneumatic supply when there is a safety hazard determined by the appropriate sensor. In addition, a locking mechanism may be provided for each door, which operates to prevent opening of the door where an unsafe condition has been determined to exist by a sensor. A locking mechanism may also act to prevent the opening of the door when another door in the chute system is open.

The pneumatic supply may be located inside or outside of the chute, and the pneumatic pressure supplied to a plurality of doors by a flexible hose, which may be enclosed in a conduit for mechanical protection.

The door may be fitted with flanges, mounted near the two vertical edges, and extending towards the chute so as to guide the material into the chute. The height of the flanges may vary from a high value at the base of the door where the door is journalled to the frame, to a low value at distal end of the door. The lower ends of the rods extending from the main pneumatic cylinder and the pneumatic spring that are more distal from the cylinders of each may be journally attached to flanges near the base of the door. The flanges are preferably mounted orthogonally to the door and facing the chute, and may be positioned near the side edges of the door. The rods are journally attached to the door flanges at the flange end closest to the door journal, positioned such that a suitable lever arm exists between each attachment point at the flange end closest to the door journal and the door journal. The ends of the cylinders more distal from the rods are each journally attached to the frame, to a flange extending from the frame, or to a fairing joining the frame to the chute.

Alternatively, a strut may be disposed near the base end of the door, extending orthogonal to the door surface, in the direction of the interior of the chute. The distal end of the rod extending from the main pneumatic cylinder may be connected to the strut so as to create a lever arm with respect to the door journal. The spring may also be connected in this manner. Further, the strut may be connected directly to the journal, or an extension thereof.

The rod of the main pneumatic cylinder may be restrained by a sliding bracket, which may be journalled to the door flange or the strut such that the door may be opened manually as an alternative means of operation, or in the event of failure of the pneumatic supply.

The main pneumatic cylinder and the spring may be positioned such that they are disposed between the door flanges and the door frame, or between a strut and the door frame, such that the width of the door is not increased over that of a manually operated door, while providing the same width of opening. Alternatively the main pneumatic cylinder and the spring may be attached to a strut extending orthogonal to an extension of the door journal, such that the strut is not positioned within the door opening in the frame.

In addition, the actuating switch for initiating the opening of the door may be located on the door frame or at some other convenient location. The pneumatic control mechanism may also be located on the door frame or at some other convenient location.

These and other advantages of the present invention will become apparent to those skilled in the art on reading the following detailed description and viewing the drawings, in conjunction with the claims.

DETAILED DESCRIPTION OF THE INVENTION

The present invention may be better appreciated with reference to the drawings and description, which are understood as representing aspects of the invention, but not intending to limit the scope thereof, which is set forth in the claims. Corresponding elements in drawings are identified by the same numeral or symbol.

Figure 1:
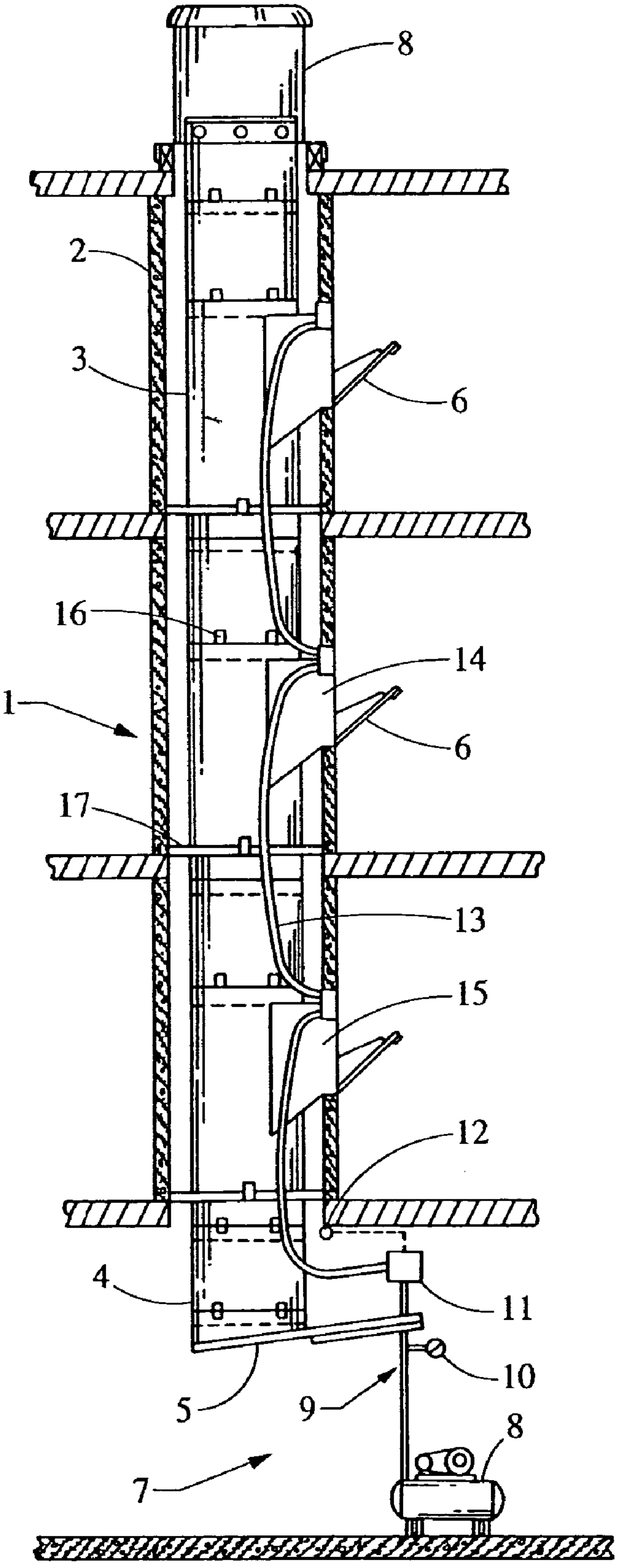
FIG. 1 is a elevation cross-section view of a chute system in accordance with an aspect of the present invention having a plurality of pneumatically actuated access doors.

FIG. 1 illustrates a chute system including the pneumatically actuated doors. The chute system 1 comprises a vertical enclosure 2 designed to meet mechanical, environmental and safety requirements associated with the structure in which the chute system 1 is to be installed. Inside the vertical enclosure 2 is a chute 3 extending from the lower end of the vertical enclosure 2 to the top end of the vertical enclosure 2, with the base end 4 of the chute 3 being closed by a flap 5 held in place by a spring (not shown) or a counterweight (not shown) such that the material introduced to the chute 3 can open the flap by the weight of the material and be deposited in an area 7, which is typically a trash room or service area, for subsequent removal. The upper end of the vertical structure 2 may extend through the roof and be fitted with a ventilation cap 8 such that odors may be exhausted to the outside air, and to provide access to the chute system for maintenance.

Each floor requiring access to the chute system is provided with a pneumatically actuated access door 6, whose operation will be described later. The motive power to operate the pneumatically actuated access doors 6 may be provided by an air compressor 8 and an air distribution system 9. The air distribution system has a shut-off valve 10 for maintenance purposes and a solenoid shut-off valve 11, whose operation is controlled by a sensors 12, which may be temperature, smoke or other environmental sensors such that, if a preset threshold is exceeded, the air supply is not provided to the pneumatically actuated access doors 6. The air from the compressor 8 is supplied to each of the pneumatically actuated access doors 6 by a flexible tube. The tube may be made of ¼" HD polyethelene tubing or similar material and the tube may be contained in a flexible conduit 13 to protect the tube against damage from the material being introduced to the chute 3. In the event that the solenoid shut off valve 11 is actuated, the flexible tube may be vented to the ambient environment such that residual air pressure is removed from the pneumatically actuated access doors 6.

As will be described later, the air supply is routed to each floor in sequence by a method that permits the independent actuation of any of a plurality of pneumatically actuated access doors 6. More than one door may be independently actuated to open during a particular time period or, alternatively, the pneumatic control system may permit only one door to be open at a time. Depending on the number of floors in the installation, it may also be desirable to deliver the air in a larger tube to a higher starting floor, thus segmenting the system into zones, and ensuring adequate air pressure throughout. A separate compressor 8 may be used for each zone, or multiple compressors used for redundancy.

The chute 3 may be square, rectangular, circular or any other regular cross section, depending on the design requirements. The pneumatically operated door assembly 6 penetrates the vertical structure 2 through an opening 14 provided in the vertical structure 2, and also in any conventional structural walls enclosing the chute system. Additionally it penetrates the chute 3 such that a fairing 44 may join the frame 21 (see FIG. 4) of the pneumatically actuated access door assembly 6 and the chute 3 so as to prevent material from entering the space between the vertical structure 2 and the chute 3.

The chute 3 may be constructed of prefabricated components having an appropriate cross section, and being stacked one on top of another, with attachment members to keep the sections in alignment. Preferably a support 17 is provided for the chute by connection to the vertical structure 2.

Figure 2:
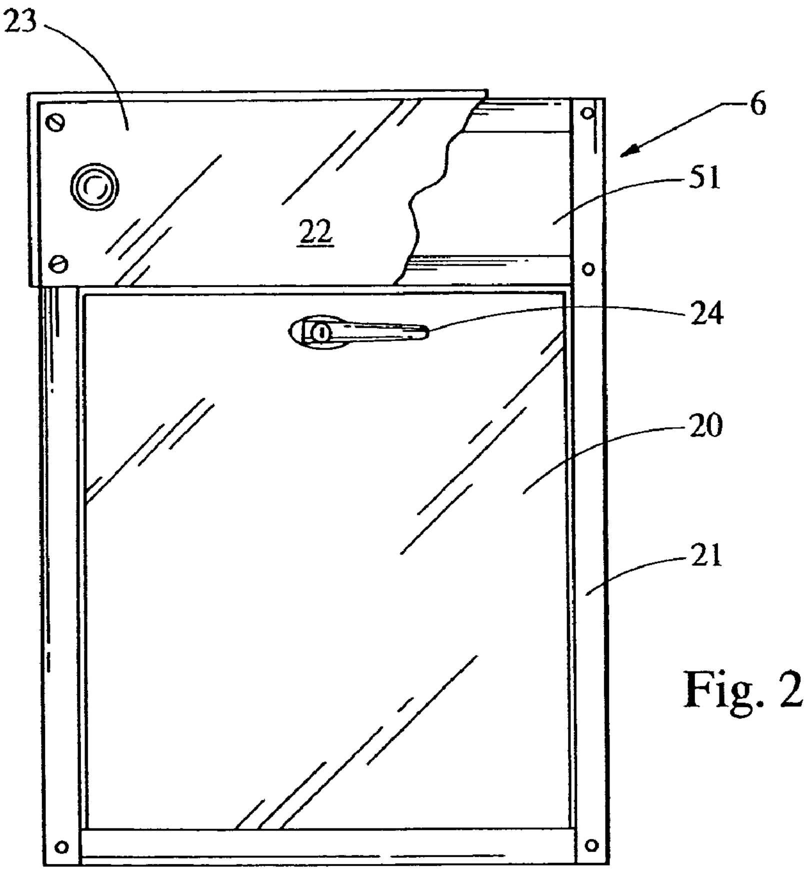
FIG. 2 is a front view of a pneumatically actuated access door in accordance with an aspect of the present invention showing an operation switch and a handle for manual operation.
Figure 3:
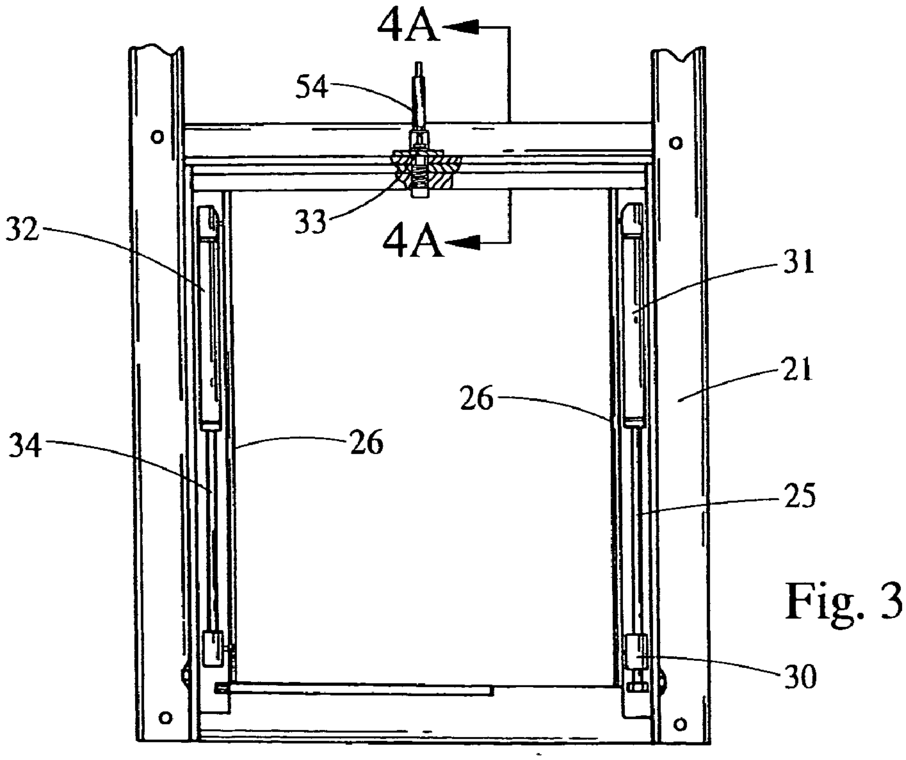
FIG. 3 is a rear view of the pneumatically operated door illustrating the placement of the main pneumatic cylinder and the air spring in an embodiment of the present invention.

FIG. 2 is a front view of a pneumatically actuated access door assembly 6 in a closed position. The door 20 is fitted to a frame 2 which is sized to fit the hole 14 provided in the vertical structure 2, corresponding to the opening in the chute 3. The frame 21 may be manufactured of welded steel elements such as angle brackets, bent sheet stock and the like. Materials other than steel which meet the safety and design requirements may be used. At the upper end of the frame 21 a cover plate 22 provides access to the pneumatic door control unit 51, and may support the door opening command switch button 23. Pressing the command switch button 23 initiates the door opening process, which will be described later. FIG. 3 is a partial back view of the pneumatically actuated access door assembly 6. The main pneumatic cylinder 31 or pneumatic forcer is disposed such that the upper end is journalled to the rear of the frame 21 or to a flange 44 extending rearward from the frame 21, adjacent to the door 20, and the lower end, being an extensible rod 25 extending from the main pneumatic cylinder 31, passes through a journalled slide bracket 30 attached to a door flange 26 which may be orthogonal to the door 20 and which projects towards the chute 3. A door closing device, which may be an air spring 32, or a metal spring or the like may be journalled to the rear of the frame 21 or to the frame flange 44 at a side opposite that of the main pneumatic cylinder 31, at its upper end and journally connected to a door flange 26. Alternatively, both the door closing device and the main pneumatic cylinder may be located at the same side of the door.

Figure 4:
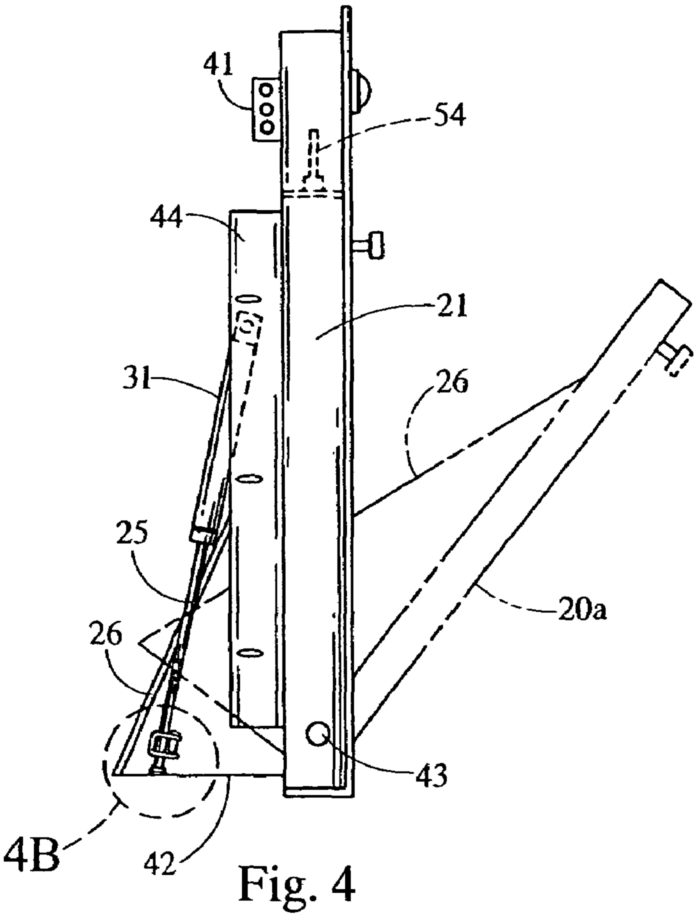
FIG. 4 is a side view of the pneumatically operated access door a showing aspects of the door in a closed and an open position.
Figure 4A:
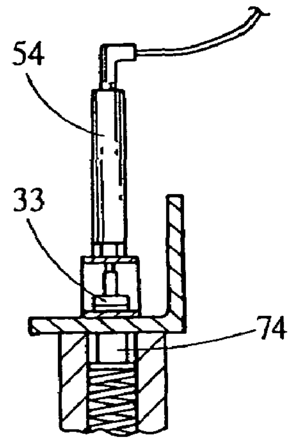
FIG. 4A is a detail taken along line A—A of FIG. 4, illustrating the operation of the latch bolt in accordance with an embodiment of the present invention.

FIG. 4 shows a partial side view of the pneumatically actuated access door assembly 6, illustrating the door 20 in both an open and closed aspect. When the door is in a closed position, the rod 25 of the main pneumatic cylinder 31 is in an extended position, and the rod 34 of the air spring 32 is in an extended position, when measured with respect to the positions of each respectively, when the door is in an open position. Operation of the journalled slide 30 will be described subsequently.

Figure 5:
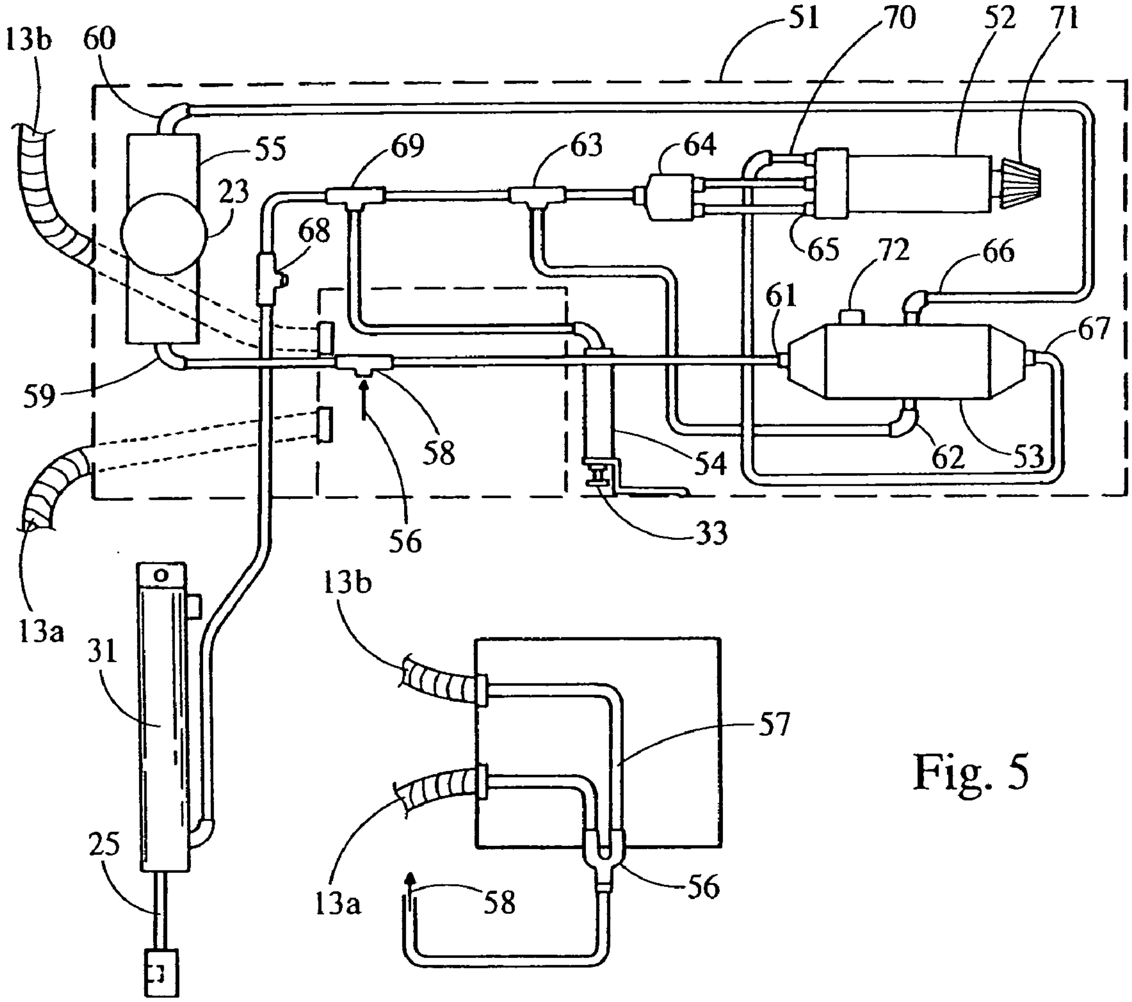
FIG. 5 is a block layout diagram illustrating the control system for the pneumatically actuated door.

FIG. 5 is a layout of an embodiment of the pneumatic door control unit 51. This may be located behind the access panel 23 at each pneumatically controlled access door assembly 6. Alternatively, the pneumatic door control unit may be located at some other convenient place and only the pneumatic pressure needed to actuate the door supplied to the door assembly 6. The air supply from the compressor 8 may be routed in turn to each of the pneumatic door control units 51 by the conduit enclosed flexible hose 13. The pneumatic door control unit 51 consists of a timer 52, an compressed air routing switch 53, a bolt actuation mechanism 54, if required, the operator command switch 55 and air distribution and regulation components, which will now be described in conjunction with the operation of the pneumatic door control unit 51.

The air supply 13*a* enters the pneumatic door control unit 51 through an entry box, and is fed to a "Y" connector 56, connected such that one of the legs of the "Y" connector is connected to another conduit enclosed flexible hose 13*b* that exits the pneumatic door control unit 51 and continues to another pneumatically controlled access door assembly 6. The remaining leg of the "Y" provides the compressed air supply to the pneumatic door control unit 51. The air supply is routed to a "T" connector 58. An output of the "T" connector 58 is routed to an input port 59 of the operator command switch 55, which may be a push-button switch, lever switch or similar air control device or it may be a device that senses the presence of a person, such as an infra-red detector. Ordinarily this switch will be of a momentary-operation type and permit the air to flow from the input port 59 to the output port 60 when it is actuated by depressing the operator command button 23. The output 60 of the operator command 55 switch is routed to the input of a two port alternate action transfer valve 53. The input to the two-port alternate action transfer valve is the other output of the "T" connector 58, and the output port 62 of the two-port alternate action transfer valve is fed to the input port 65 of the pneumatic timer valve 52 through a "T" connector 63 and a splitter 64.

The pneumatic timer valve 52 may have a manual adjustment means, such as a knob 71, which is arranged such that it controls the time duration of the cycle.

When the operator command button 23 is depressed, compressed air present at the input port 59 of the operator command switch 55 is permitted to reach the output port 60 while the operator command button 23 continues to be depressed and is then routed to a first control port 66 of the two-port alternate action transfer valve 53, causing the valve to switch such that the compressed air routed to input port 61 thereof is allowed to reach the output port 62. Once this switch action occurs, the transfer valve remains in this state, even if the operator command button 23 is released, until there is a pneumatic input to the second control port 67. The compressed air output 62 from the transfer switch is routed through a "T" connector 63 to actuate the main pneumatic cylinder 31, to apply air pressure to the pneumatic timer valve 52, and to also supply air pressure to the latch release mechanism 54, if required. A flow control regulator 68 is inserted in the output of the "T" connector between "T" connector 69 and the input to the main pneumatic cylinder 31. The flow control regulator 68 functions to regulate the rate at which air can be supplied to the main pneumatic cylinder 31. The flow control regulator 68 provides for an adjustment to regulate the rate at which the door 20 opens when the air pressure is applied, and may also be used to compensate for pressure drops in the feed lines, which may depend on the distance between the compressor 8 and a specific door 6.

An output of the "T" connector 64 is routed to the pneumatic timer valve 52. When air pressure is applied, the timer valve 52 begins the timing cycle in accordance with a preset value. When the time has expired, the compressed air is routed from the input port 65 of the timer valve 52 to the output port 70 of the timer valve 52. The compressed air output from the timer valve 52 is routed to the input of the second control port 67 of the two-position transfer valve 53, causing the switch to return to its original position, thus removing the air pressure from the main pneumatic cylinder 31, the timer 52 and the latch release 54 (if installed).

With the operation of the pneumatic control unit having been described, the physical operation of the door is now described. As shown in FIG. 4, the door 20 is journalled 43 at its base end to the frame 21, and both the main pneumatic cylinder 31 and the air spring 32 (not shown in this view) are connected between an upper side of the door frame 21 or door flange 44 and an end of the door flange 26 proximal to the journal 43. The locations of the journal attachment points on the door flange 26 are spaced such that a lever arm is created between each attachment point and the journal 43. When the operator command button 55 is actuated, the pneumatic control unit acts to apply compressed air to the main pneumatic cylinder 31. This urges the push rod 25 to retract into the cylinder 31. The stop 27 (FIG. 4B) comes into contact with the lower end 29 of the journalled slide bracket 30 and applies and a rotational force about the journal 43 that attaches the door 20 to the frame 21 urging the door 20 to rotate about the journal 43 so as to open. As the door 20 begins to rotate open, the rod 34 of the air spring 32 is urged into the air spring 32 and the restoring force increases as the rod 34 is urged further into the air spring 32. This results in rotational force applied through a lever arm on the journal 43 resisting the opening force provided by the main pneumatic cylinder 31.

The door rotates about the journalled axis 43 so as to swing from the vertical towards the horizontal, but its motion is stopped at a point which may be determined by one of several design methods. The main pneumatic cylinder rod 25 may reach the full extent of its permitted motion into the cylinder 31, a mechanical stop may be constructed such that an extension of the door 20 abuts the frame 21 after a specific angular rotation, or the restoring torque developed by the air spring 32 becomes equal to the opening torque provided by the main pneumatic cylinder 31, when measured about the journal 43.

Once the door has rotated to its open position 20*a*, and motion has been stopped, by any of the previously described mechanisms, the operator may introduce the desired material into the chute. The door remains open, since the pneumatic pressure continues to be applied to the main pneumatic cylinder 31. After the expiry of the preset time interval, the timer 52 permits the application of air pressure to the second control port 67 of the two-port transfer switch 53 such that the compressed air is no longer supplied to the main pneumatic cylinder 31. At this time the opening force is reduced as the air pressure is vented outside the compressed air system through a breather 72 fitted to the two-port control valve 53, the rod 34 extends and the air spring 32 urges the door 20 to return to a closed position. The door 20 rotates to the closed position, and the latch reengages.

The operation of the main pneumatic cylinder 31, the air spring 32 and the journalled slide bracket 30 are now further described in the context of an opening and closing sequence of the door 20 by pneumatic means. When the door is in a closed position, the rod 25 of the main pneumatic cylinder 35 is in an extended position and the rod 34 of the air spring 32 is in an extended position. The air spring 32 may continue to exert a small force urging the door 20 closed against the frame 21. This may help ensure proper closure of the door over a period of use when the friction in the journal 43 may increase, or due to misalignment of mechanical components. When the door open command button 23 is pushed and air pressure is applied to the main pneumatic cylinder 31, the air pressure urges the rod 25 to retract into the main pneumatic cylinder 31. The stop 27 comes into contact with the bottom end 29 of the slide bracket 30, resisting the retraction of the rod 25, and urging the door 20 to rotate about the journal 43. As the door 20 begins to rotate to an open position 20*a*, the rod 34 of the air spring 32 is urged into the air spring 32 causing the air spring 32 to increase the resistance to further entry of the rod 34. This increased force may be used to limit the motion of the door 20 to a maximum rotation, or a mechanical stop may be used. When the door has reached its maximum rotation it is restrained from closing by the continued force exerted by the main pneumatic cylinder 31 until such time as the pneumatic control unit 51 removes the air pressure from the main pneumatic cylinder 31 and permits the pressure to vent to the external environment through the breather 70. As the removal of air pressure results in a greater rotational force being applied by the air spring 32 than is being applied by the main pneumatic cylinder 31, the door 20 is urged to rotate into a closed position. As the door 20 rotates into a closed position, the rod 25 extends from the main pneumatic cylinder 31, being urged to do so by the force exerted by the bottom of the slide bracket 29 on the stop 27. Since the air flow out of the main pneumatic cylinder 31 may be restricted, some opposing force to closure may be encountered, with the main pneumatic cylinder 31 acting as a damper during this portion of the cycle. During the closure of the door, the rod 34 extends from the air spring 32 in response to the urging by the force built up in the air spring 32 during the opening part of the cycle.

If the door begins to close before the operator has completed introducing the intended material, the operator command switch 23 may again be actuated, the air pressure reapplied and the timer reset as if a new door opening cycle had been commenced. Since the air pressure will be limited to that of the air supply to the pneumatic control unit, reapplication of the air pressure prior to door closure does not cause any damage or malfunction.

The means of attachment of the lower end of the main pneumatic cylinder rod 25 to the door flange 25 by the journalled slide bracket 30 is such that the door may be opened manually from outside the chute by pulling on a handle 24 attached to the door 20, after rotating the handle, or otherwise disengaging the latch bolt 74. The journalled slide bracket assembly 30, being slidably attached to the rod 25 and journalled to the door flange 26, may slide with respect to the rod 25 such that the rod 25 may remain in its extended position with respect to the main pneumatic cylinder 31 when the door is being opened manually. To do this the slide bracket assembly 30 slides along the push rod in the direction opposite to the stop 27, and thus does not exert any force on the journal 43. The opening of the door 20 in the manual mode is resisted by the entry of the rod 34 into the air spring 32. The door may be manually opened until either a mechanical stop prevents further rotation, or the operator has exerted a force equal to that of the restoring force of the air spring 32, as determined about the door journal 43, or the air spring has reached its maximum travel in the compressed direction. When the door is manually operated and reaches an open position, and the operator releases the handle 24, the restoring force of the air spring 32 urges the door closed.

Figure 4B:
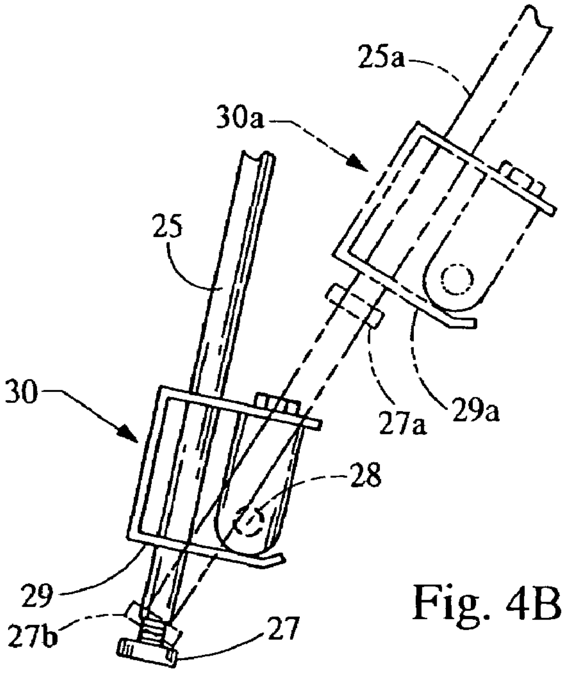
FIG. 4B is a detail illustrating the relationship of the journalled slide bracket to the rod of the main pneumatic cylinder when the door is in a closed position, and when the door has been manually or pneumatically opened.

FIG. 4B illustrates the relationship of the journalled slide bracket 30 to the rod 25 in several aspects of the door position. When the door 20 is in a closed position, the rod 25 extends through the journalled slide bracket such that one end enters the main pneumatic cylinder 31, and the end more distal from the cylinder is terminated in a stop 27. The stop 27 may be threaded and inserted into an end of the rod 25 such that the distance between the stop 27 and a lower surface 29 of the journalled slide bracket 30 may be adjusted for the situation when the door is in a closed position. Alternatively, the end of the rod may be threaded and one or more nuts threaded onto the rod to achieve a similar adjustment. The stop 27 may also be applied to the end of the rod 30 by swaging, welding or other technique that may not permit adjustment.

The journalled slide bracket 30 may be journally attached to the door flange 26 by a pin or bolt 28 so that the rod and the door flange 26 may rotate angularly with respect to each other when the door 20 is opened by rotation about the journal 43.

When air pressure is applied to the main pneumatic cylinder 31, the rod 25 is urged into the main pneumatic cylinder 31 and, if the stop 27 is not already in contact with the bottom surface 29 of the journalled slide bracket 30, the movement of the rod 25 into the main pneumatic cylinder 31 causes such contact. As the rod 25 is urged further into the main pneumatic cylinder 31 by the air pressure, the force exerted by the stop 27 on the lower surface 29 of the journalled slide hinge 30 acts through the lever arm of the door hinge 26 about the door journal 43 providing the rotational force urging the door 20 into an open position. When the door 20 has reached an open position, the relationship of the rod, the stop and the journalled slide are shown in FIG. 4B as elements 25*a*, 27*a*, and 30*a*, respectively.

When the door 20 is opened manually, the rod 25 is not urged into the main pneumatic cylinder 31 and remains in an extended position, so that the stop 27 remains in approximately its original position, but has rotated angularly as shown in element 27*b*. The force to open the door 20 is provided by a person operating the handle 24, resulting in a rotational moment about the door journal 43. As the door rotates into an open position, the journalled mounting bracket 30 slides freely along the rod 25, permitting the rotation of the door 20 about the door journal 43. In this situation, the stop 27 is not in contact with the bottom 29 of the journalled slide bracket 30. When the operator releases the handle, the air spring 32 urges the door 20 into a closed position and the relative positions of the components returns to the aspect shown in FIG. 4B in solid lines.

Figure 5A:
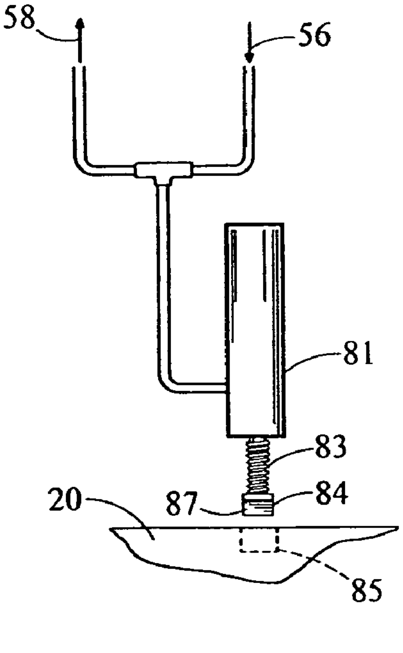
FIG. 5A is a detail of the pneumatic supply for the situation illustrating a connection of the interlock latch to the pneumatic supply

Another aspect of the present invention is a lockout, shown in FIG. 5A, which prevents the door from being opened manually in the same circumstances where the door is prevented from being opened pneumatically. A pneumatically operated latch bolt 84 is fitted to the frame 21 such that it engages a hole 85 in the door 20. The latch bolt 84 is normally retracted by the air pressure in the system applied to pneumatic cylinder 81. When the air pressure is vented to the environment, exemplary of a situation where door is to be prevented from opening, for example, due to an environmental problem, the latch bolt 84 engages the hole 85 in the door 20. The latch bolt has a beveled surface 87 whose orientation is such that the door may close completely if it is in an open position at the time that the locking event occurs. The door then cannot be opened again until the air pressure is restored.

Figure 6:
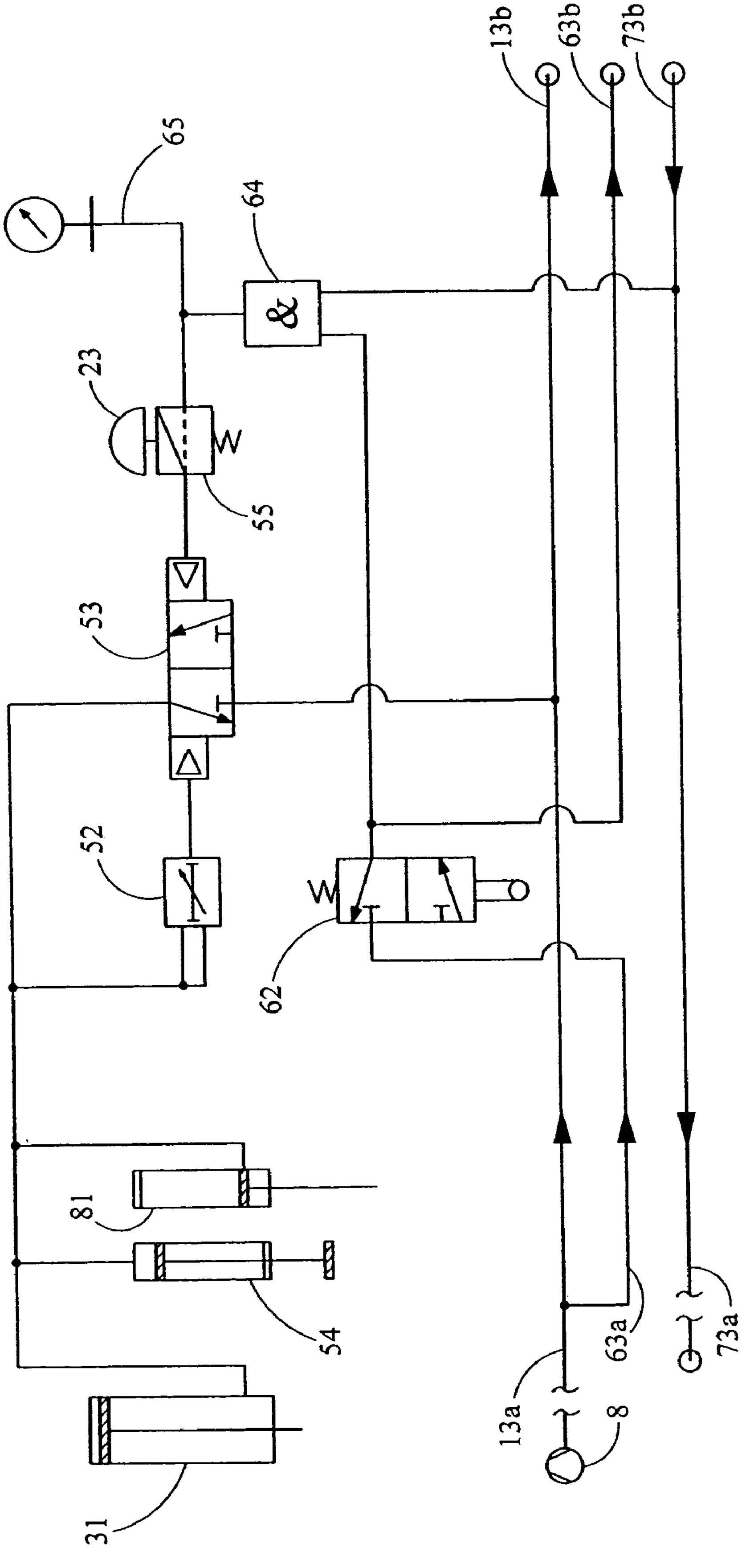
FIG. 6 is a detail of the pneumatic supply for the situation where the door may be locked closed when another door has been opened.

A further aspect of the present invention is a lockout which prevents the door from being opened whenever another door is open, shown in FIG. 6. It also acts in a similar manner with respect to all of the doors in the event that the main pneumatic supply is vented as described above. The same latch mechanism for preventing the opening the door described in the previous paragraph may be used, with additional components, which will be described. A pneumatic limit switch 62 senses whether the door is open or closed. When the button 23 of the operator command switch 55 of a door assembly 6 is pressed and the door 20 opens as previously described, the pneumatic limit switch 62 causes the air supply line 63*b* to the higher floors to be vented to ambient. The air line 63*b* is connected to the air line 63*a* of the next higher floor. The air line 63*a* is only connected to the main air supply 13*a* at the lowest door in the arrangement (that door being shown in FIG. 6). At the top of the series of doors having the lockout, the air supply line 63 is connected to an air supply line 73, which runs from the top door to the bottom door, having an input to an "AND" valve at each door. Air pressure is applied to the pneumatic switch 55 only when air pressure is present in both the air supply line 63 and the air supply line 73. Thus, if any door is open, another door cannot be opened.

The operation of the control mechanism will now be described with particular reference to FIG. 6, but many alternative arrangements of realizing this aspect of the invention will be apparent to persons skilled in the art. In the state where no door is open, air pressure is present in air supply lines 63 and 73, and any door may be opened. In this state, each "AND" valve 64, having air pressure applied at both input ports, is in an "on" state and operates such that air pressure is present at an input side of operator command switch 55. When an operator presses a command push button 23, the door mechanism operates in a normal manner as previously described. As the door 20 begins to swing open, this is sensed by the pneumatic limit switch 62, which vents the air supply line 63*b* to ambient. Since this supply line is connected to the air supply line 63*a* of the next higher door, the air supply line 63*a* for the next higher door assembly 6 will not have air pressure, the "AND" valve 64 at the next higher door assembly 6 will be in an "off" state, and no air pressure will be supplied to the input of the operator command switch 55. Thus the next higher door 20 cannot be opened. This situation pertains to all higher doors. Although it will be appreciated that the process of opening the door initiated in this manner will result in the "AND" switch 64 for the door being opened changing to the "off" state, as the air supply lines 63 and 73 are vented to ambient by this action, the pneumatic timer 52 has already been actuated, and the air pressure will be applied to the cylinder 31 for the duration of the door opening cycle. This discussion has described the situation where a lower door has been opened.

Now the situation where a higher door is opened is described. Since the air supply line 63 is connected to the air supply line 73 at the top of the sequence of doors, the opening of any door below the connection point of the two air supply lines will result in the venting of the air pressure in air supply line 73. In this situation, each "AND" valve will be in the "off" state, and no air pressure will be supplied to any of the operator command switches 55, and no other door can be opened.

When the door that is presently open returns to a closed position, the associated limit switch 62 terminates the venting of air to ambient and resulting in repressurizing the air supply lines 63 and 73 at all of the doors. Another door may now be opened.

In the situation as described, the lockout cylinder 81 is only supplied with air pressure when the door with which it is associated is activated to be opened. The air pressure applied to the cylinder 81 retracts the bolt 84 from the hole 85 in he door 20, permitting it to be opened. When no air pressure is applied to the cylinder 81, a spring 83 urges the bolt 84 into the hole 85, preventing the door 20 from opening.

In a further aspect, the latch release cylinder 54 and the associated spring loaded bolt 74 may be omitted, and only a pulling handle 24 affixed to the door, as the lockout mechanism may serve the purpose of securing the door closed.

In a further aspect, an indicator 65 which senses air pressure may be connected to the operator command switch side 55 of the "AND" valve 64 such that the indicator 65 provides an operator with an indication that the door 20 may be opened. Indicators of various types may be used, including those which are directly pneumatically actuated as well as electromechanical and electronic types.

The invention has been described with respect to a number of exemplary embodiments. It will be apparent to persons skilled in the art that many modifications and alterations to these embodiments are practical. The invention is therefore limited only by that which is claimed.

What is claimed is:

1. A chute system comprising:

a chute extending vertically;

an access port being formed in the chute;

a door fitted to the access port so as to close the access port when the door is in a closed position, the door being journalled such that it opens rotatably to permit access to an interior of the chute; and wherein the door is urged open by a pneumatic forcer adapted to communicate with a source of pneumatic pressure.

2. The chute system in accordance with claim 1, further comprising a spring which urges the open door towards the closed position.

3. The chute system in accordance with claim 1, wherein a plurality of doors are supplied with pneumatic pressure from an air reservoir.

4. The chute system in accordance with claim 1, further comprising an environmental sensor, and a vent valve, wherein the actuation of the environmental sensor actuates the vent valve to divert the pneumatic pressure from the door.

5. The chute system in accordance with claim 4, wherein the door cannot be opened manually when the pneumatic pressure has been diverted.

6. The chute system in accordance with claim 1, wherein the pneumatic forcer is actuated by a switch.

7. The chute system in accordance with claim 1, wherein only one door can be open at a time.

8. The chute system in accordance with claim 1, wherein the pneumatic forcer is operatively connected between the access port and the door.

9. The chute system in accordance with claim 8, wherein the pneumatic forcer is disposed between a frame of the access port and the door.

10. The chute system in accordance with claim 9, wherein the pneumatic forcer has a cylinder and a rod, the cylinder being journalled to the frame and the rod being slidably journalled to the door.

11. The chute system in accordance with claim 10, wherein the door has a flange mounted orthogonally to the door and extending towards an interior of the chute, and the rod is slidably journalled to the flange at the end of the door which is journalled to the access port.

12. The chute system in accordance with claim 11, wherein the slidable journal forms a lever arm with respect to the door journal.

13. The chute system in accordance with claim 2, wherein the spring is a coil spring.

14. The chute system in accordance with claim 3, wherein the spring is an air spring.

15. The chute system in accordance with claim 3, wherein the spring is pneumatic spring.

16. The chute system in accordance with claim 2, wherein the spring is disposed between a frame of the aperture and the door.

17. The chute system in accordance with claim 14 wherein the air spring is disposed between a frame of the aperture and the door.

18. The chute system in accordance with claim 17, wherein one end of the air spring is journally connected to the frame and the other end of the air spring is journally connected to the door.

19. The chute system in accordance with claim 17, wherein opening of the door results in compression of the air spring, such that a restoring rotational force urges the door towards the closed position.

20. The chute system according to claim 19, wherein the door has a flange mounted orthogonally to the door and extending towards an interior of the chute, and one end of the spring is attached to the flange at the end of the door which is journalled to the access port.

21. The chute system according to claim 20 where the attachment of the one end of the spring forms a lever arm with respect to the door journal.

22. The chute system in accordance with claim 6, wherein the pneumatic pressure is applied to the pneumatic forcer for a predetermined period of time.

23. The chute system in accordance with claim 21, wherein the period of time is regulated by a pneumatic timer.

24. The chute system in accordance with claim 22, wherein the period of time is adjustable.

25. The chute system in accordance with claim 1, wherein the door has a rotatable handle actuating a latch mechanism which must be released prior to opening the door.

26. The chute system in accordance with claim 25, wherein a pneumatic actuator is positioned in the access port frame such that it opposes the latch mechanism, and the actuator extends sufficiently far when actuated so as to release the latch mechanism.

27. The chute system in accordance with claim 25 wherein the pneumatic actuator is actuated whenever the pneumatic forcer is supplied with pneumatic pressure.

28. The chute system in accordance with claim 25 wherein the latch is a bolt with a beveled end, which is spring urged into a hole in the frame opposing the location of the bolt in the door, the beveled end oriented such that the bevel faces towards the interior of the chute, so that when the door closes the bolt is depressed sufficiently to slide into the access port frame and engage an opposing hole.

29. The chute system according to claim 10, wherein the door can be opened by pulling on a handle attached to the exterior of the door.

30. The chute system according to claim 1, wherein a plurality of doors may be supplied with pneumatic pressure from a single reservoir.

31. The chute system according to claim 1, wherein a first plurality of doors may be supplied with pneumatic pressure from a first reservoir and a second plurality of doors may be supplied with pneumatic pressure from a second reservoir.

32. The chute system according to claim 6, wherein the switch is located on the frame of the aperture.

33. The chute system according to claim 6, wherein the switch is located away from, but within sight of, the frame.

34. The chute system according to claim 33, wherein the switch is a foot actuated switch.

35. The chute system according to claim 1, having an interlock bolt in the door, to prevent the opening of more than one door at a time.

36. The chute system according to claim 34, where the interlock bolt is disposed in the access port frame, opposing a hole in the periphery of the door.

37. A chute system comprising:

a chute extending vertically;

an access door assembly having a surrounding frame capable of being fitted into an opening in a wall;

a door being journally mounted to the frame such that it can swing away from the wall;

a pneumatic forcer operably connected to the frame and the door to rotatably move the door from a closed position to an open position; and a pneumatic control assembly having, means for actuating the door opening operation;

means for supplying pneumatic pressure to the pneumatic forcer; and means for regulating the duration of the supply of pneumatic pressure.

38. The chute system according to claim 37, further comprising means for preventing the opening of the door when pneumatic pressure is not present.

39. The chute system according to claim 37, further comprising means for preventing the opening of a second door while a first door is open.

* * * * *